(12) United States Patent
Kageyama (10) Patent No.: US 10,322,886 B2
(45) Date of Patent: Jun. 18, 2019

(54) COMBINATION WEIGHING DEVICE HAVING SUPPORT FRAME, ENGAGED MEMBER, ENGAGING MEMBER AND NON-SCREW MEMBER OR FIXING MEMBER

(71) Applicant: ISHIDA CO., LTD., Kyoto (JP)

(72) Inventor: Toshiharu Kageyama, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 72 days.

(21) Appl. No.: 15/508,352

(22) PCT Filed: Aug. 19, 2015

(86) PCT No.: PCT/JP2015/073282
§ 371 (c)(1),
(2) Date: Mar. 2, 2017

(87) PCT Pub. No.: WO2016/042969
PCT Pub. Date: Mar. 24, 2016

(65) Prior Publication Data
US 2017/0305684 A1    Oct. 26, 2017

(30) Foreign Application Priority Data

Sep. 19, 2014  (JP) ................................. 2014-191869

(51) Int. Cl.
*B65G 47/20* (2006.01)
*F16B 7/04* (2006.01)
(Continued)

(52) U.S. Cl.
CPC ................ *B65G 47/20* (2013.01); *F16B 7/04* (2013.01); *G01G 11/003* (2013.01);
(Continued)

(58) Field of Classification Search
CPC ......... B65G 47/20; F16B 7/04; G01G 11/003; G01G 19/387; G01G 19/393; G01G 23/00; H05K 999/99; F16L 33/00
(Continued)

(56) References Cited

U.S. PATENT DOCUMENTS 2,546,770 A * 3/1951 Morey ...................... B01L 7/00
126/25 A
3,954,238 A * 5/1976 Nivet .................... F16L 3/1075
248/68.1
(Continued)

FOREIGN PATENT DOCUMENTS

| JP | H05-14019 U | 2/1993 |
|----|-------------|--------|
| JP | 2002-296098 A | 10/2002 |
| JP | 2014-139552 A | 7/2014 |

OTHER PUBLICATIONS

International Search Report issued in PCT/JP2015/073282; dated Sep. 15, 2015.
(Continued)

*Primary Examiner* — Natalie Huls
*Assistant Examiner* — Monica S Young
(74) *Attorney, Agent, or Firm* — Studebaker & Brackett PC (57) ABSTRACT

To provide a highly reliable combination weighing device having an object supply chute disposed above a dispersion section, which can prevent foreign matter from being mixed into objects due to the falling of screw members from a support frame supporting the object supply chute. A combination weighing device is provided with a dispersion section, weighing hoppers, a control unit, an object supply chute (150), and a support frame (100). The dispersion section disperses and supplies objects around the dispersion section. The weighing hoppers are arranged around the dispersion section. The control unit performs combination
(Continued)

calculation based on weighing values in the weighing hoppers. The object supply chute is placed above the dispersion section and supplies the objects to the dispersion section. The support frame supports the object supply chute. The support frame includes members (111, 113, and 114) as engaged members, hooks as engaging members that engage with the engaged members, and fixing members (140) as non-screw members. The fixing members press the engaging members against the engaged members and fix the engaging members to the engaged members.

9 Claims, 6 Drawing Sheets (51) Int. Cl.
  *G01G 11/00* (2006.01)
  *G01G 23/00* (2006.01)
  *G01G 19/387* (2006.01)
  *G01G 19/393* (2006.01)
(52) U.S. Cl.
  CPC ......... *G01G 19/387* (2013.01); *G01G 19/393* (2013.01); *G01G 23/00* (2013.01)
(58) Field of Classification Search
  USPC ...................................................... 177/25.13
  See application file for complete search history.

(56) References Cited

U.S. PATENT DOCUMENTS

| | | | | |
|---|---|---|---|---|
| 5,263,671 | A * | 11/1993 | Baum | B62J 11/00 24/543 |
| 6,095,473 | A * | 8/2000 | Engers | B62J 9/00 224/425 |
| 6,188,029 | B1 * | 2/2001 | Miyamoto | G01G 19/393 177/105 |
| 8,882,072 | B2 * | 11/2014 | Hattori | B29C 45/006 248/346.03 |
| 2002/0139589 | A1 * | 10/2002 | Matsuyama | G01G 19/393 177/25.18 |
| 2004/0159454 | A1 * | 8/2004 | Shibuya | B60R 16/0215 174/545 |
| 2013/0306584 | A1 * | 11/2013 | Hofmann | H02B 1/01 211/182 |

OTHER PUBLICATIONS

Notification of Transmittal of Translation of the International Preliminary Report on Patentability and Translation of the Written Opinion of the International Searching Authority issued in PCT/JP2015/073282; dated Mar. 21, 2017.

The extended European search report issued by the European Patent Office dated Sep. 11, 2017, which corresponds to European Patent Application No. 15842593.4-1557 and is related to U.S. Appl. No. 15/508,352.

* cited by examiner

COMBINATION WEIGHING DEVICE HAVING SUPPORT FRAME, ENGAGED MEMBER, ENGAGING MEMBER AND NON-SCREW MEMBER OR FIXING MEMBER

TECHNICAL FIELD

The present invention relates to a combination weighing device, and particularly a combination weighing device equipped with an object supply chute above a dispersion section.

BACKGROUND ART

Combination weighing devices that use a dispersion section to disperse and supply objects around the dispersion section, use plural weighing hoppers to weigh the objects dispersed and supplied, and perform combination weighing based on the weighing results are known. In such combination weighing devices, there are cases where an object supply chute is disposed above the dispersion section in order to supply the objects to an appropriate position in the dispersion section. The object supply chute is supported by a support frame that extends from a main body having the dispersion section. In the support frame, as described in patent document 1 (JP-U No. H5-14019) for example, screw members are used in order to make the attachment position of the object supply chute adjustable and/or the object supply chute detachable for cleaning and the like.

SUMMARY OF INVENTION

Technical Problem

However, in the case of using screw members in the support frame such as described in patent document 1 (JP-U No. H5-14019), there is a risk that the screw members will become loose, fall off, and be mixed into the objects (products) that are the target of the combination weighing. Therefore, it is required to take steps such as frequent check of the looseness of the screw members. Such steps increase the burden on the worker.

It is an object of the present invention to provide a highly reliable combination weighing device with an object supply chute disposed above a dispersion section dispersing and supplying objects around the dispersion section, which can prevent the foreign matter from being mixed into the objects due to the falling of screw members from a support frame supporting the object supply chute.

Solution to Problem

A combination weighing device pertaining to a first aspect of the present invention is provided with a dispersion section, weighing hoppers, a control unit, an object supply chute, and a support frame. The dispersion section is configured to disperse and supply objects around the dispersion section. The weighing hoppers are arranged around the dispersion section. The control unit is configured to perform combination calculation based on the weighing values in the weighing hoppers. The object supply chute is arranged above the dispersion section and is configured to supply the objects to the dispersion section. The support frame is configured to support the object supply chute. The support frame includes an engaged member, an engaging member configured to engage with the engaged member, and a non-screw member. The non-screw member is configured to press the engaging member against the engaged member and fix the engaging member to the engaged member.

In the combination weighing device pertaining to the first aspect of the present invention, the non-screw member is used for fixing the engaging member to the engaged member in the support frame which supports the object supply chute. Therefore, in contrast to the case of using a screw member which may become loose and fall off, it can be prevented that the screw member as foreign matter is mixed into the objects.

A combination weighing device pertaining to a second aspect of the present invention is the combination weighing device pertaining to the first aspect, wherein the non-screw member is configured to elastically deform at least partially and press the engaging member against the engaged member with elastic force.

In the combination weighing device pertaining to the second aspect of the present invention, the engaging member is pressed against the engaged member by elastic force. Therefore, it is easy to tightly fix the engaging member in a desired position.

A combination weighing device pertaining to a third aspect of the present invention is the combination weighing device pertaining to the first aspect or the second aspect, wherein the non-screw member is configured to be used for fixing the engaging member to the engaged member at all locations above the dispersion section and the weighing hoppers.

In the combination weighing device pertaining to the third aspect of the present invention, only the non-screw member is used for fixing the engaging member to the engaged member above the dispersion section and the weighing hoppers. It is therefore easy to be prevented that the foreign matter is mixed into the objects which are the targets of the combination weighing.

A combination weighing device pertaining to a fourth aspect of the present invention is the combination weighing device pertaining to any of the first aspect to the third aspect, wherein the engaging member is a hook being configured to engage with the engaged member.

In the combination weighing device pertaining to the fourth aspect of the present invention, the hook serving as the engaging member can be hooked to the engaged member and thereby both of the hook and the engaged member can be easily engaged with each other.

A combination weighing device pertaining to a fifth aspect of the present invention is the combination weighing device pertaining to any of the first aspect to the fourth aspect, wherein the non-screw member includes a roof portion. The non-screw member is configured to cover the engaging member which is pressed against the engaged member by this non-screw member from above with the roof portion.

In the combination weighing device pertaining to the fifth aspect of the present invention, the upper part of the engaged section of the engaging member and the engaged member on which scattered fragments of the objects and so forth is prone to accumulate are covered with the roof portion. Therefore, fragments of the objects and so forth hardly accumulate and better sanitary condition is achieved.

A combination weighing device pertaining to a sixth aspect of the present invention is the combination weighing device pertaining to the fifth aspect, wherein the roof portion slopes relative to a horizontal plane.

In the combination weighing device pertaining to the sixth aspect of the present invention, the roof portion slopes relative to a horizontal plane. Therefore, it is easy to prevent fragments of the objects and so forth from accumulating on the roof portion and better sanitary condition is achieved.

A combination weighing device pertaining to a seventh aspect of the present invention is the combination weighing device pertaining to any of the first aspect to the sixth aspect, wherein the non-screw member is non-detachably and movably attached to the engaged member.

In the combination weighing device pertaining to the seventh aspect of the present invention, since the non-screw member is non-detachably attached to the engaged member, it is possible to prevent the non-screw member from falling off. Furthermore, since the non-screw member is movably attached to the engaged member, it is easy to adjust the position of the object supply chute.

A combination weighing device pertaining to an eighth aspect of the present invention is the combination weighing device pertaining to any of the first aspect to the seventh aspect, wherein at least one engaging member is secured to an outer peripheral surface of the object supply chute. The non-screw member configured to press the engaging member secured to the outer peripheral surface of the object supply chute against the engaged member and fix that engaging member to that engaged member is arranged in a position where that non-screw member is hidden by the object supply chute and unsighted when viewed in a top view.

In the combination weighing device pertaining to the eighth aspect of the present invention, the upper side of the non-screw member, which fixes the engaging member secured to the object supply chute to the engaged member, is hidden by the object supply chute. Therefore, it is possible to prevent fragments of the objects and so forth from accumulating on the non-screw member which fixes the object supply chute to the engaged member and thereby better sanitary condition is achieved.

A combination weighing device pertaining to a ninth aspect of the present invention is the combination weighing device pertaining to any of the first aspect to the eighth aspect, wherein the support frame further includes a strut member extending upward and a spacer through which the strut member is configured to be inserted. The strut member is configured to support an upper frame including the engaged member and the engaging member. The upper frame has an insertion engagement portion through which the strut member it to be inserted. The spacer is arranged under the insertion engagement portion.

In the combination weighing device pertaining to the ninth aspect of the present invention, the spacer is included in the support frame. Therefore, it is easy to adjust the position of the upper frame in the vertical direction without using screw members.

A combination weighing device pertaining to a tenth aspect of the present invention is provided with a dispersion section, weighing hoppers, a control unit, an object supply chute, and a support frame. The dispersion section is configured to disperse and supply objects around the dispersion section. The weighing hoppers are arranged around the dispersion section. The control unit is configured to perform combination calculation based on the weighing values in the weighing hoppers. The object supply chute is arranged above the dispersion section and configured to supply the objects to the dispersion section. The support frame is configured to support the object supply chute. The support frame includes an engaged member, an engaging member configured to engage with the engaged member, and a fixing member. The fixing member is configured to be switchable between a first state and a second state. The first state is a state in which the fixing member restricts the movement of the engaging member engaged with the engaged member. The second state is a state in which the fixing member releases the restriction of the movement of the engaging member. The fixing member is connected to a part of the support frame other than that fixing member in both the first state and the second state.

Preferably, in both the first state and the second state, the fixing member is connected to the engaged member, to which the engaging member whose movement is regulated by this fixing member in the first state engages.

In the combination weighing device pertaining to the tenth aspect of the present invention, in the support frame, the fixing member connected to a part of the support frame (other than the fixing member itself) is utilized for fixing the engaging member to the engaged member. Therefore, the fixing member can be prevented from falling off as foreign matter and being mixed into the objects.

Advantageous Effects of Invention

In the combination weighing device pertaining to the present invention, the non-screw member is used for fixing the engaging member to the engaged member in the support frame which supports the object supply chute. Therefore, in contrast to the case of using a screw member which may become loose and fall off, it can be prevented that screw member as foreign matter is mixed into the objects.

BRIEF DESCRIPTION OF DRAWINGS

FIG. 3 shows a state in which a dispersion table and radiation feeders to be attached to the main body frame are detached.

FIG. 5 shows a state in which a second fixing member presses a second hook against a third member and fixes the second hook to the third member. Furthermore, FIG. 5 shows another state in which the fixing of a third hook to the third member is released.

FIG. 6 particularly shows an enlarged view of the second hook.

DESCRIPTION OF EMBODIMENT

A combination weighing device 10 pertaining to an embodiment of the present invention will be described with reference to the drawings. The embodiment described below is a specific example of the present invention and is not intended to limit the technical scope of the present invention.

(1) Overall Configuration

Figure 1:
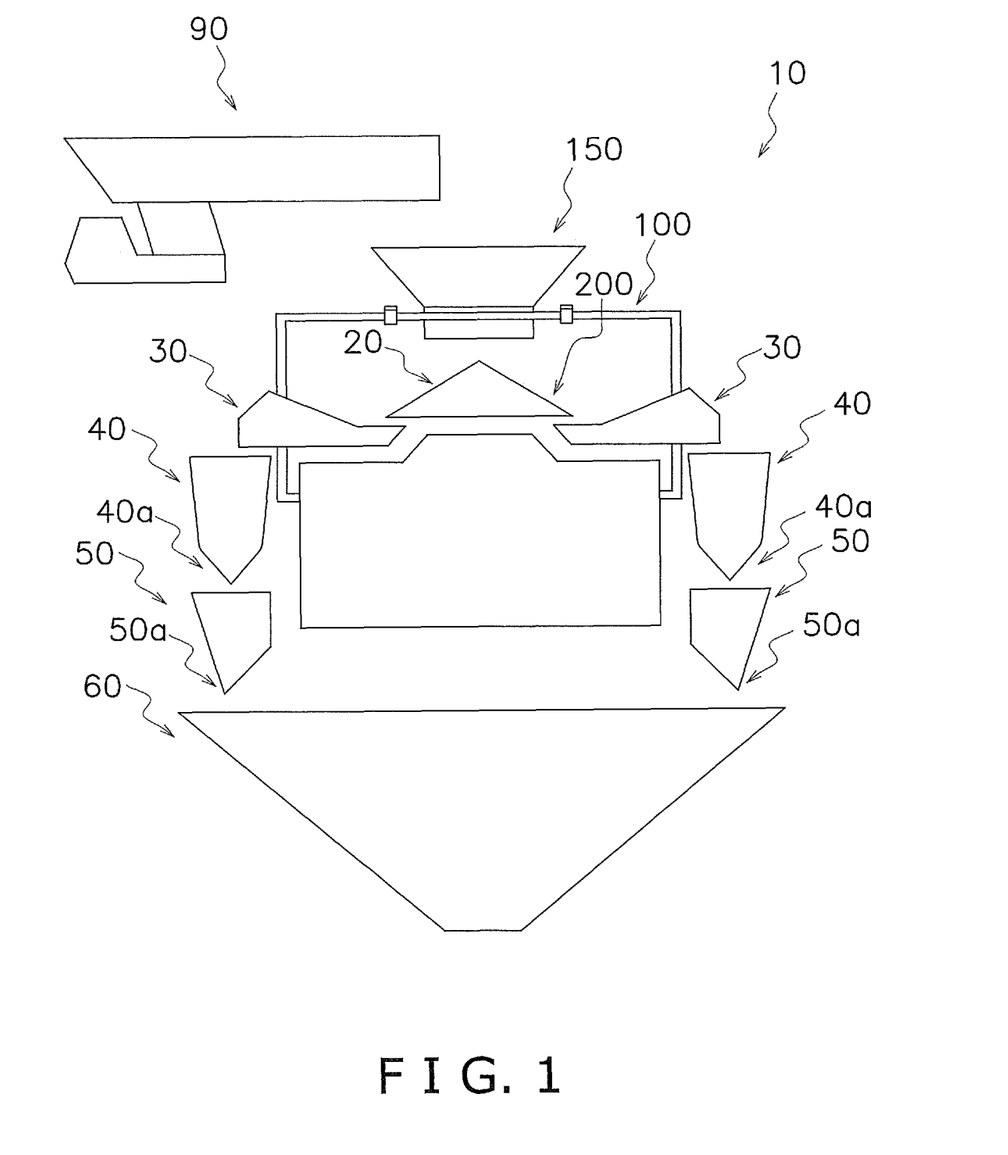
FIG. 1 is a schematic side view of a combination weighing device pertaining to an embodiment of the present invention.
Figure 2:
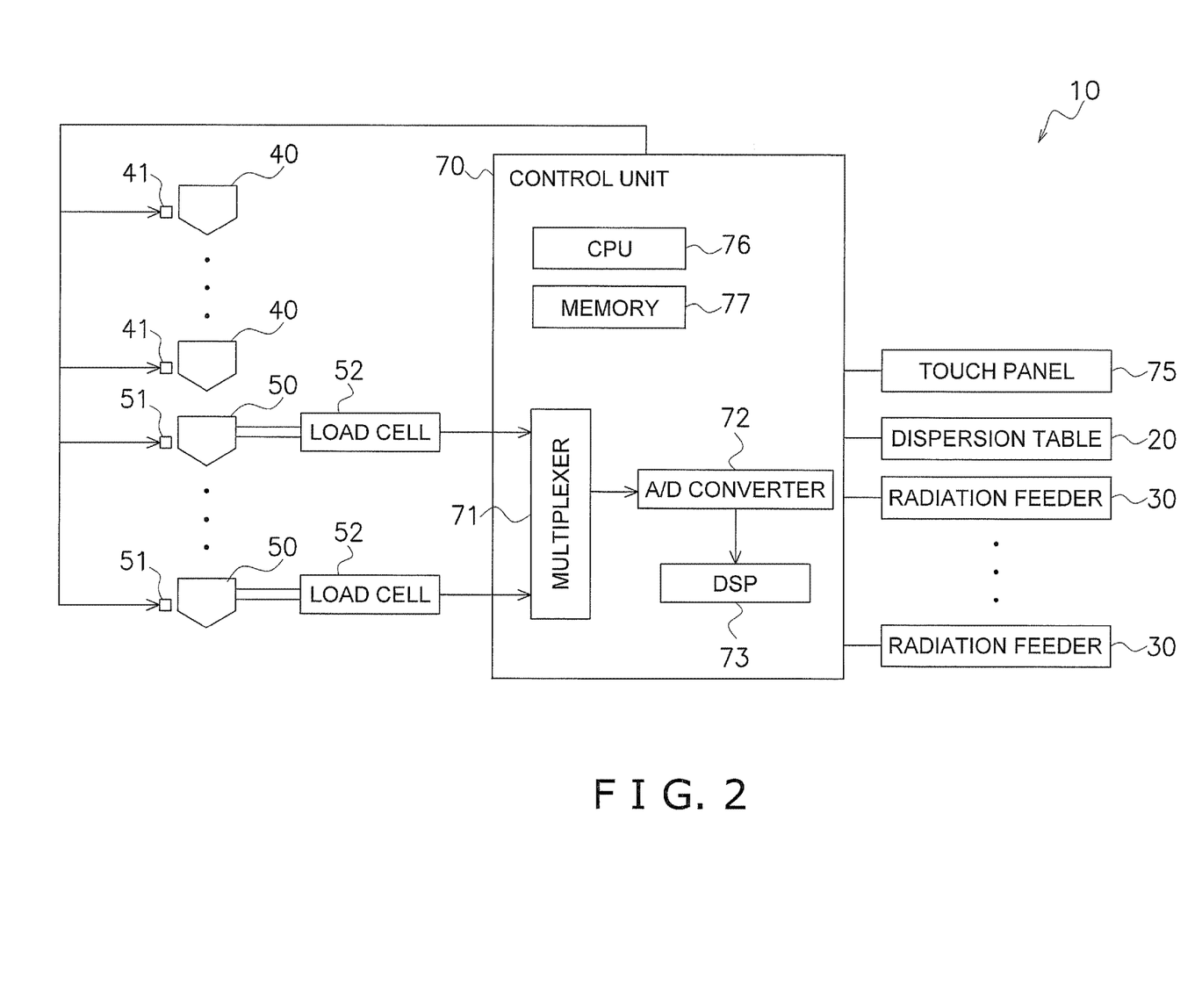
FIG. 2 is a block diagram of the combination weighing device of FIG. 1.

FIG. 1 is a schematic side view of the combination weighing device 10 pertaining to an embodiment of the present invention. FIG. 2 is a block diagram of the combination weighing device 10.

Figure 3:
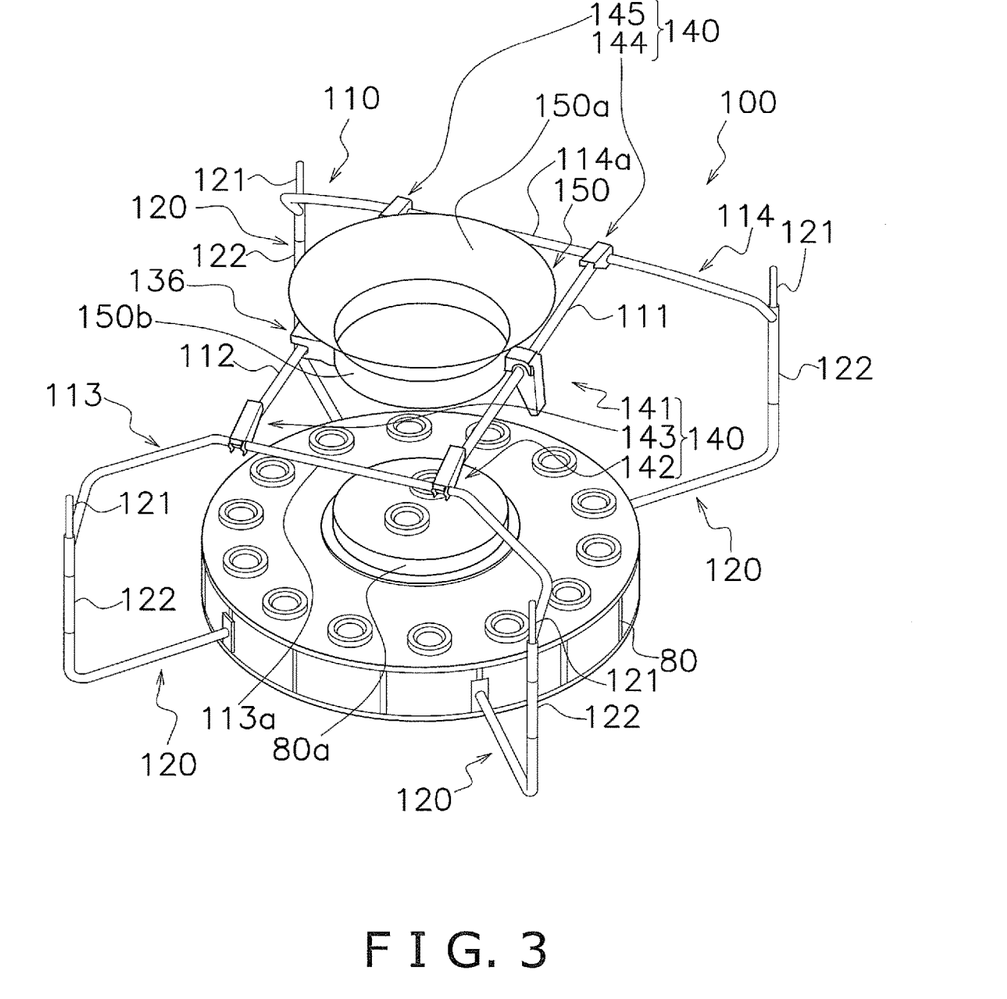
FIG. 3 is a perspective view showing a support frame for an object supply chute and the object supply chute supported by the support frame which are attached to a main body frame of the combination weighing device of FIG. 1.

The combination weighing device 10 is mainly provided with an object supply chute 150, a dispersion section 200, plural pool hoppers 40, plural weighing hoppers 50, a collection and discharge chute 60, a main body frame 80, a support frame 100, and a control unit 70 (see FIG. 1 to FIG. 3). The dispersion section 200 includes a dispersion table 20 and plural radiation feeders 30 (see FIG. 1). The plural radiation feeders 30 are annularly arranged around the dispersion table 20 with the dispersion table 20 in the center. The main body frame 80 supports the dispersion table 20, the radiation feeders 30, and the support frame 100 (see FIG. 3). The support frame 100 supports the object supply chute 150, which is arranged above the dispersion section 200 and more specifically directly above the dispersion table 20 of the dispersion section 200.

The combination weighing device 10 generally functions as follows.

Objects to be weighed by the combination weighing device 10 are conveyed by a cross feeder 90 to the combination weighing device 10. The objects are, for example, food, but are not limited to this. The objects conveyed by the cross feeder 90 are fed into the object supply chute 150. The objects fed into the object supply chute 150 are supplied to the dispersion section 200, more specifically the dispersion table 20. The dispersion section 200 disperses and supplies the objects supplied via the object supply chute 150 around the dispersion section 200. More specifically, the dispersion table 20 of the dispersion section 200 conveys the objects while dispersing them and supplies the objects to the plural radiation feeders 30 arranged around the dispersion table 20. Each of the radiation feeders 30 of the dispersion section 200 conveys and supplies the objects supplied from the dispersion table 20 to the pool hopper 40 disposed in correspondence to that radiation feeder 30. The objects supplied to each of the pool hoppers 40 are delivered to the weighing hoppers 50 arranged under those pool hoppers 40. The control unit 70 performs combination calculation based on the weighing values of the objects in the plural weighing hoppers 50. Then, the control unit 70 selects a combination of objects whose combination calculation result is in a prescribed allowance range and closest to a target value. The objects in the weighing hoppers 50 included in the selected combination are discharged to the collection and discharge chute 60. The objects discharged to the collection and discharge chute 60 are, for example, supplied to a bag-making and packaging machine installed as the next process of the combination weighing device 10.

(2) Detailed Configuration

The details of the combination weighing device 10 will be described.

(2-1) Object Supply Chute

The object supply chute 150 is arranged below the end portion of the cross feeder 90 which feeds the objects into the object supply chute 150 (below the end portion on the side where the cross feeder 90 feeds the objects into the object supply chute 150) as shown in FIG. 1. Furthermore, the object supply chute 150 is arranged above the dispersion table 20 of the dispersion section 200 (see FIG. 1). The object supply chute 150 receives the supply of the objects conveyed by the cross feeder 90 and supplies the objects to the dispersion table 20 of the dispersion section 200.

The object supply chute 150 mainly has a circular truncated cone-shaped portion 150a and a cylindrical portion 150b (see FIG. 3). The cylindrical portion 150b is formed continuously with the circular truncated cone-shaped portion 150a and under the circular truncated cone-shaped portion 150a (see FIG. 3). The circular truncated cone-shaped portion 150a is formed in the shape of a hollow circular truncated cone whose lower portion (on the dispersion table 20 side) is narrower compared to its upper portion (on the cross feeder 90 side) (see FIG. 3). The cylindrical portion 150b is formed in the shape of a hollow cylinder. Due to a presence of the object supply chute 150, the objects fed from the cross feeder 90 are supplied onto the dispersion table 20 without falling outside the dispersion table 20.

The object supply chute 150 is supported by the support frame 100. The support frame 100 will be described later.

(2-2) Dispersion Section

The dispersion section 200 disperses and supplies the objects around the dispersion section 200. The objects that are dispersed and supplied by the dispersion section 200 are supplied via the pool hoppers 40 to the weighing hoppers 50 arranged around the dispersion section 200. The dispersion section 200 includes the dispersion table 20 and the plural (here, fourteen) radiation feeders 30 annularly arranged around the dispersion table 20. It should be noted that the number of the radiation feeders 30 is an example and is not limited to this.

(2-2-1) Dispersion Table

The dispersion table 20 is a table-like member formed in the shape of a circular cone (see FIG. 1). The dispersion table 20 disperses and supplies the objects, which are supplied from the cross feeder 90, to the plural radiation feeders 30.

The dispersion table 20 receives the supply of the objects from the cross feeder 90 installed above the dispersion table 20 via the object supply chute 150. The dispersion table 20 is vibrated by non-illustrated electromagnets to thereby convey the supplied objects outward in the radial direction while dispersing the supplied objects in the circumferential direction. The objects conveyed to the outer edge of the dispersion table 20 are supplied to the plural radiation feeders 30 arranged below the outer edge side of the dispersion table 20.

(2-2-2) Radiation Feeders

The plural radiation feeders 30 are annularly arranged around the dispersion table 20. The plural radiation feeders 30 radially extend from the dispersion table 20 in the center. The radiation feeders 30 supply the objects supplied from the dispersion table 20 to the weighing hoppers 50 arranged around the dispersion section 200.

Each of the radiation feeders 30 is vibrated by non-illustrated electromagnets to thereby convey the objects supplied from the dispersion table 20 outward in the radial direction (a direction away from the dispersion table 20). The objects conveyed to the outer edge of each of the radiation feeders 30 are supplied to the pool hopper 40, which is arranged below the outer edge side of each of the radiation feeders 30. The objects supplied to the pool hopper 40 are then supplied to the weighing hopper 50, which is arranged under each of the pool hoppers 40 as described later.

(2-3) Pool Hoppers

The combination weighing device 10 has the same number of pool hoppers 40 as the radiation feeders 30. One of the pool hoppers 40 is respectively arranged under the outer edge of each of the radiation feeders 30. The pool hoppers 40 temporarily pool the objects that are supplied from the radiation feeders 30 arranged above the pool hoppers 40.

Each pool hopper 40 has a PH gate 40a in its lower portion (see FIG. 1). When the PH gate 40a is opened, the objects in the pool hopper 40 are supplied to the weighing hopper 50 arranged under the pool hopper 40. A non-illustrated link mechanism is operated by a stepping motor 41 so that each PH gate 40a is opened or closed (see FIG. 2). The opening and closing of the stepping motor 41 is controlled by the control unit 70.

(2-4) Weighing Hoppers

The combination weighing device 10 has the same number of weighing hoppers 50 as the pool hoppers 40. One of the weighing hoppers 50 is respectively arranged under each of the pool hoppers 40. The weighing hoppers 50 are placed around the dispersion section 200. The weighing hoppers 50 weigh the weights of the objects supplied from the pool hoppers 40, that is, the weights of the objects supplied via the pool hoppers 40 from the radiation feeders 30.

Each weighing hopper 50 has a WH gate 50a in its lower portion (see FIG. 1). When the WH gate 50a is opened, the objects in the weighing hopper 50 are supplied to the collection and discharge chute 60. A non-illustrated link mechanism is operated by a stepping motor 51 so that each WH gate 50a is opened or closed (see FIG. 2). The opening and closing by the stepping motor 51 is controlled by the control unit 70.

Each weighing hopper 50 has a load cell 52 for weighing the objects retained in the weighing hopper 50 (see FIG. 2). The weighing result of the load cell 52 is sent as a weighing signal via a non-illustrated amplifier to a multiplexer 71 of the control unit 70 described later (see FIG. 2).

(2-5) Collection and Discharge Chute

The collection and discharge chute 60 collects the objects supplied from the weighing hoppers 50 and discharges them to the outside of the combination weighing device 10. The objects discharged to the outside of the combination weighing device 10 are, for example, supplied to a non-illustrated bag-making and packaging machine installed below the collection and discharge chute 60 and the like.

(2-6) Main Body Frame

The main body frame 80 is a frame formed in a column shape (see FIG. 3). The main body frame 80 mainly supports the dispersion section 200 and the support frame 100.

The upper portion of the main body frame 80 supports the dispersion table 20 and the radiation feeders 30 from below. Specifically, the dispersion table 20 is supported at an upwardly projecting portion 80a (see FIG. 3) in the center of the main body frame 80. Furthermore, the radiation feeders 30 are supported by the section of the main body frame 80 that is lower than the upwardly projecting portion 80a and arranged around the periphery of the upwardly projecting portion 80a. It should be noted that FIG. 3 shows a state in which the dispersion table 20 and the radiation feeders 30 are detached.

The side surface of the main body frame 80 supports the support frame 100. Specifically, end portions of strut members 120 of the support frame 100 described later are secured to the side surface of the main body frame 80 so that the support frame 100 is supported by the main body frame 80 (see FIG. 3).

(2-7) Support Frame

The support frame 100 supports the object supply chute 150. The support frame 100 itself is supported by the main body frame 80. The support frame 100 includes an upper frame 110, fixing members 140, four strut members 120, and spacers 122 (see FIG. 3).

(2-7-1) Upper Frame

The upper frame 110 includes a first member 111, a second member 112, a third member 113, and a fourth member 114 (see FIG. 3). The first member 111, the third member 113, and the fourth member 114 are examples of engaged members. The upper frame 110 includes a first hook 131, a second hook 132, a third hook 133, a fourth hook 134, a fifth hook 135, and a horizontal engagement hook 136 (see FIG. 4). The first hook 131, the second hook 132, the third hook 133, the fourth hook 134, and the fifth hook 135 are examples of engaging members.

The first member 111 and the second member 112 are rod-shaped members that extend parallel to each other in the horizontal direction in a state where the object supply chute 150 is supported with the support frame 100 (see FIG. 3). The first member 111 and the second member 112 are hollow round pipes. The second hook 132 and the fourth hook 134 are disposed on both ends of the first member 111 (see FIG. 4). The third hook 133 and the fifth hook 135 are disposed on both ends of the second member 112 (see FIG. 4). The second hook 132 and the fourth hook 134 are secured to both ends of the first member 111 by welding, for example. As a result, the end portions of the first member 111 are closed so that the inside of the first member 111 (the inside of the round pipe) is separated from the outside. Furthermore, the third hook 133 and the fifth hook 135 are secured to both ends of the second member 112 by welding, for example. As a result, the end portions of the second member 112 are closed so that the inside of the second member 112 is separated from the outside. Because both ends of each of the first member 111 and the second member 112 are closed, dust and so forth can be prevented from being collected inside the hollow round pipes and falling onto the dispersion section 200.

The third member 113 and the fourth member 114 are members shaped from hollow round pipes by bending work. Each of the third member 113 and the fourth member 114 are formed in a general U-shape (see FIG. 3). In a state in which the object supply chute 150 is supported by the support frame 100, the section (hereinafter called a horizontal portion 113a) serving as the bottom of the "U" of the third member 113 extends in the horizontal direction and in a direction intersecting the first member 111 and the second member 112. More specifically, the horizontal portion 113a extends in a direction orthogonal to the first member 111 and the second member 112 (see FIG. 3). Furthermore, in a state in which the object supply chute 150 is supported by the support frame 100, the section (hereinafter called a horizontal portion 114a) serving as the bottom of the "U" of the fourth member 114 extends in the horizontal direction and in a direction intersecting the first member 111 and the second member 112. More specifically, the horizontal portion 114a extends in a direction orthogonal to the first member 111 and the second member 112 (see FIG. 3). Insertion engagement portions 113b are disposed on both ends of the third member 113 (see FIG. 4). Insertion engagement portions 114b are disposed on both ends of the fourth member 114 (see FIG. 4). The insertion engagement portions 113b and the insertion engagement portions 114b are hollow round pipe members which open at both ends. The insertion engagement portions 113b and the insertion engagement portions 114b extend in the vertical direction in a state in which the object supply chute 150 is supported on the support frame 100. Insertion portions 121 of the strut members 120 described later are inserted through the insides of the insertion engagement portions 113*b* and the insertion engagement portions 114*b*. The interconnection of the upper frame 110 and the strut members 120 actualized by inserting the insertion portions 121 through the insertion engagement portions 113*b* and the insertion engagement portions 114*b* will be described later. At both ends of the third member 113, the peripheral surfaces of the insertion engagement portions 113*b* are secured to the third member 113, for example, by welding, so that the inside of the third member 113 (the inside of the round pipe) is separated from the outside. At both ends of the fourth member 114, the peripheral surfaces of the insertion engagement portions 114*b* are secured to fourth member 114, for example, by welding, so that the inside of the fourth member 114 is separated from the outside. Because both ends of each of the third member 113 and the fourth member 114 are closed, dust and so forth can be prevented from being collected inside the hollow members and falling onto the dispersion section 200.

The second hook 132 disposed on one end of the first member 111 and the third hook 133 disposed on one end of the second member 112 engage with the horizontal portion 113*a* of the third member 113. Furthermore, the fourth hook 134 disposed on one end of the first member 111 and the fifth hook 135 disposed on one end of the second member 112 engage with the horizontal portion 114*a* of the fourth member 114. This will be specifically described below using as an example the engagement of the second hook 132 with the horizontal portion 113*a*.

Figure 6:
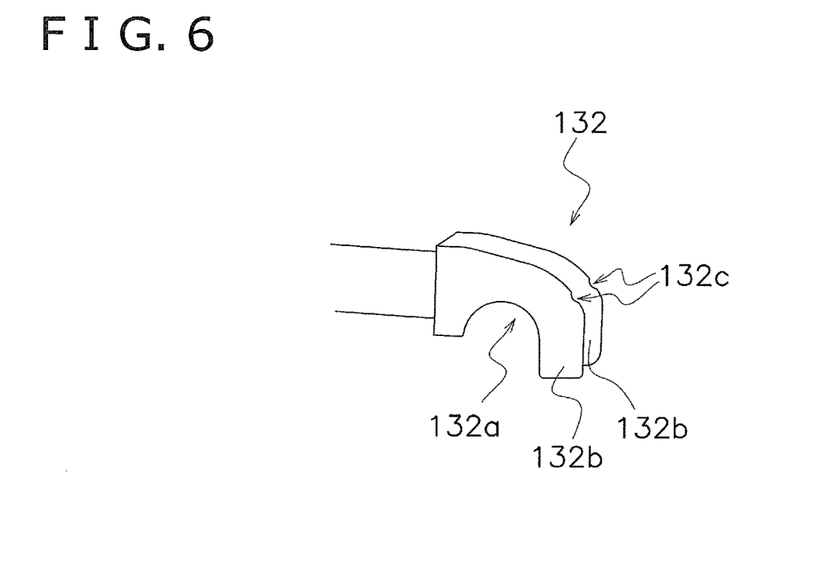
FIG. 6 shows an enlarged view of a hook of the support frame of FIG. 3.

As shown in FIG. 6, the second hook 132 mainly has two plate-shaped members 132*b*. A semicircular cutout 132*a* is formed in each of the plate-shaped members 132*b*. The two plate-shaped members 132*b* are spaced apart from and are parallel to each other. The cutouts 132*a* in the second hook 132 open downward in a state in which the object supply chute 150 is supported by the support frame 100. The diameter of the semicircle of the cutout 132*a* in the second hook 132 is equal to the outer diameter of the horizontal portion 113*a* of the third member 113. More specifically, the diameter of the semicircle of the cutout 132*a* in the second hook 132 is formed a little larger than the outer diameter of the horizontal portion 113*a* of the third member 113. The second hook 132 engages with the horizontal portion 113*a* from a direction intersecting the direction in which the horizontal portion 113*a* extends. Specifically, the second hook 132 engages with the horizontal portion 113*a* from a direction orthogonal to the direction in which the horizontal portion 113*a* extends. In other words, the cutouts 132*a* in the second hook 132 engage from above with the horizontal portion 113*a* extending in the horizontal direction. The cutouts 132*a* in the second hook 132 are hooked to the horizontal portion 113*a* from above, and the inner surfaces of the cutouts 132*a* are arranged along and oppose a part of the peripheral surface of the horizontal portion 113*a*, and thus the second hook 132 engages with the horizontal portion 113*a* of the third member 113, that is an example of the engaged member. The position where the second hook 132 engages with the horizontal portion 113*a* is adjusted in accordance with the installation position of the object supply chute 150.

The shapes of the third hook 133, the fourth hook 134, and the fifth hook 135 are the same as the shape of the second hook 132. Furthermore, the state of engagement of the third hook 133 with the horizontal portion 113*a* and the state of engagement of the fourth hook 134 and the fifth hook 135 with the horizontal portion 114*a* are the same as the state of engagement of the second hook 132 with the horizontal portion 113*a*. Therefore, description relating to the third hook 133, the fourth hook 134, and the fifth hook 135 will be omitted.

Figure 4:
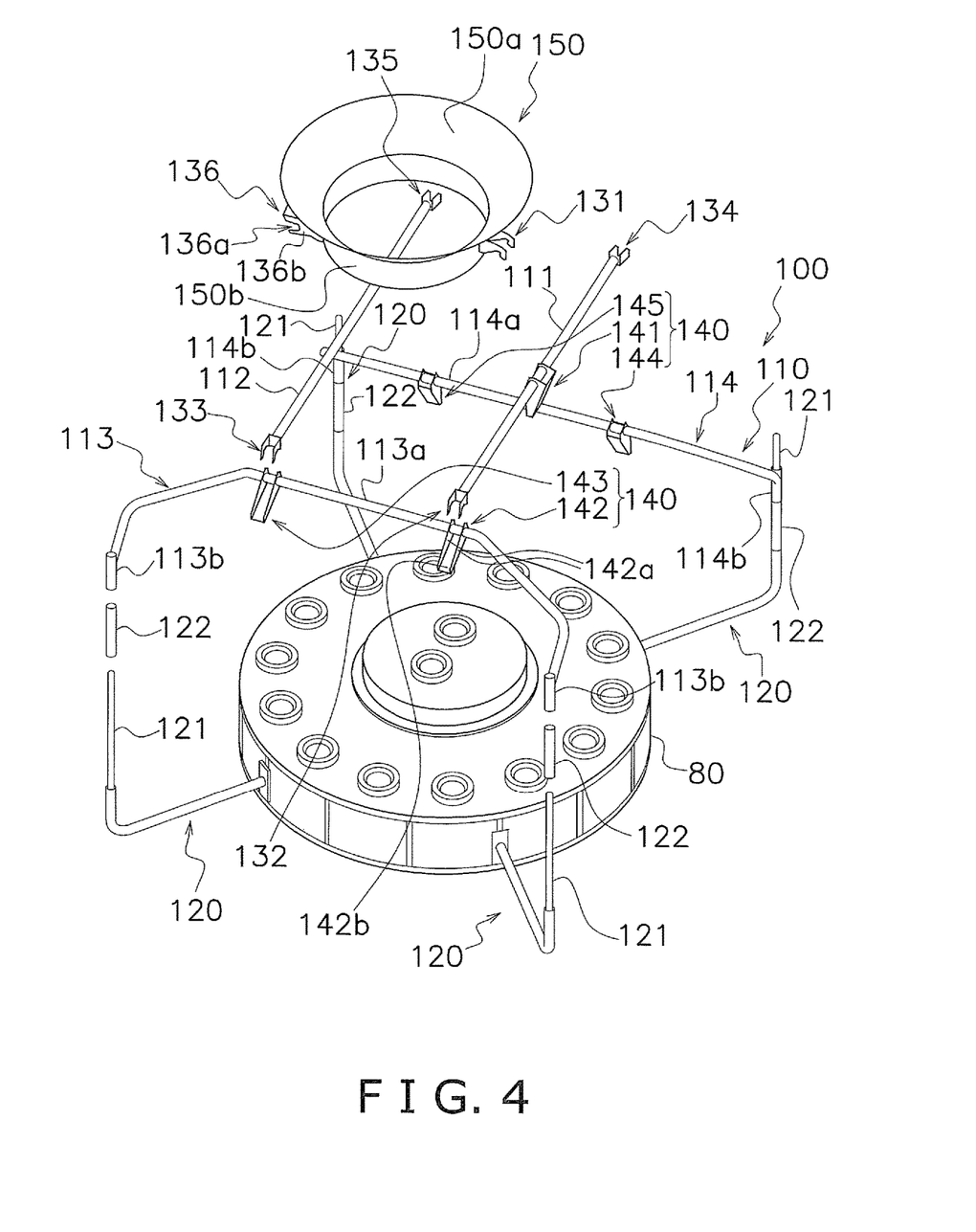
FIG. 4 shows a state of the support frame of FIG. 3 in which the fixing of hooks by fixing members is released, the hooks are detached from rod-shaped members, and a part of an upper frame is detached from strut members.

The first hook 131 and the horizontal engagement hook 136 are secured to the outer wall of the cylindrical portion 150*b* of the object supply chute 150 (see FIG. 4). The first hook 131 and the horizontal engagement hook 136 are symmetrically attached relative to the center of the cylindrical portion 150*b* when viewed in a plan view. In a state in which the object supply chute 150 is supported on the support frame 100, the first hook 131 engages with the first member 111 and the horizontal engagement hook 136 engages with the second member 112. It should be noted that the first hook 131 and the horizontal engagement hook 136 are placed in positions where they are hidden by the object supply chute 150 and unsighted when viewed in a top view. More specifically, the first hook 131 and the horizontal engagement hook 136 are placed in positions where they are hidden by the circular truncated cone-shaped portion 150*a* of the object supply chute 150 and unsighted when viewed in a top view.

The shape of the first hook 131 is the same as the shape of the second hook 132. Furthermore, the state of engagement of the first hook 131 with the first member 111 is the same as the state of engagement of the second hook 132 with the horizontal portion 113*a*. Therefore, description relating to the first hook 131 will be omitted.

The horizontal engagement hook 136 mainly has two plate-shaped members 136*b* (see FIG. 4). A semicircular cutout 136*a* is formed in each of the plate-shaped members 136*b* (see FIG. 4). The two plate-shaped members 136*b* are spaced apart from and are parallel to each other. The cutouts 136*a* in the horizontal engagement hook 136 open in the horizontal direction in a state in which the object supply chute 150 is supported on the support frame 100. Furthermore, the cutouts 136*a* in the horizontal engagement hook 136 open outward in the radial direction of the cylindrical portion 150*b*, to which the horizontal engagement hook 136 is secured, in a state in which the object supply chute 150 is supported by the support frame 100. The diameter of the semicircle of the cutout 136*a* is equal to the outer diameter of the second member 112. More specifically, the diameter of the semicircle of the cutout 136*a* in the horizontal engagement hook 136 is formed a little larger than the outer diameter of the second member 112. The horizontal engagement hook 136 engages with the second member 112 from the horizontal direction and a direction intersecting the direction in which the second member 112 extends. Specifically, the horizontal engagement hook 136 engages with the second member 112 from a direction orthogonal to the direction in which the horizontal portion 113*a* extends. The position where the horizontal engagement hook 136 engages with the second member 112 is adjusted in accordance with the installation position of the object supply chute 150.

(2-7-2) Fixing Members

The fixing members 140 are members that restrict the movement of the engaging members that engage with the engaged members. The fixing members 140 are configured to be switchable between a locked state (a first state) and an unlocked state (a second state). The locked state is a state in which the fixing members 140 restrict the movement of the engaging members engaged with the engaged members. The unlocked state is a state in which the fixing members release the restriction of the movement of the engaging members.

The fixing members 140 are an example of non-screw members. The fixing members 140 press the engaging members against the engaged members and fix the engaging members to the engaged members. The fixing members 140 include a first fixing member 141, a second fixing member 142, a third fixing member 143, a fourth fixing member 144, and a fifth fixing member 145 (see FIG. 3). The first fixing member 141, the second fixing member 142, the third fixing member 143, the fourth fixing member 144, and the fifth fixing member 145 are all placed above the dispersion section 200 and the weighing hoppers 50.

The first fixing member 141 presses the first hook 131 against and fixes the first hook 131 to the first member 111 with which the first hook 131 engages. The second fixing member 142 presses the second hook 132 against and fixes the second hook 132 to the third member 113 with which the second hook 132 engages. The third fixing member 143 presses the third hook 133 against and fixes the third hook 133 to the third member 113 with which the third hook 133 engages. The fourth fixing member 144 presses the fourth hook 134 against and fixes the fourth hook 134 to the fourth member 114 with which the fourth hook 134 engages. The fifth fixing member 145 presses the fifth hook 135 against and fixes the fifth hook 135 to the fourth member 114 with which the fifth hook 135 engages. That is to say, in the locked state, the first to fifth fixing members 141, 142, 143, 144, and 145 respectively restrict the movement of the first to fifth hooks 131, 132, 133, 134, and 135.

The shape of the fixing members 140 will be described using the second fixing member 142 as an example.

Figure 5:
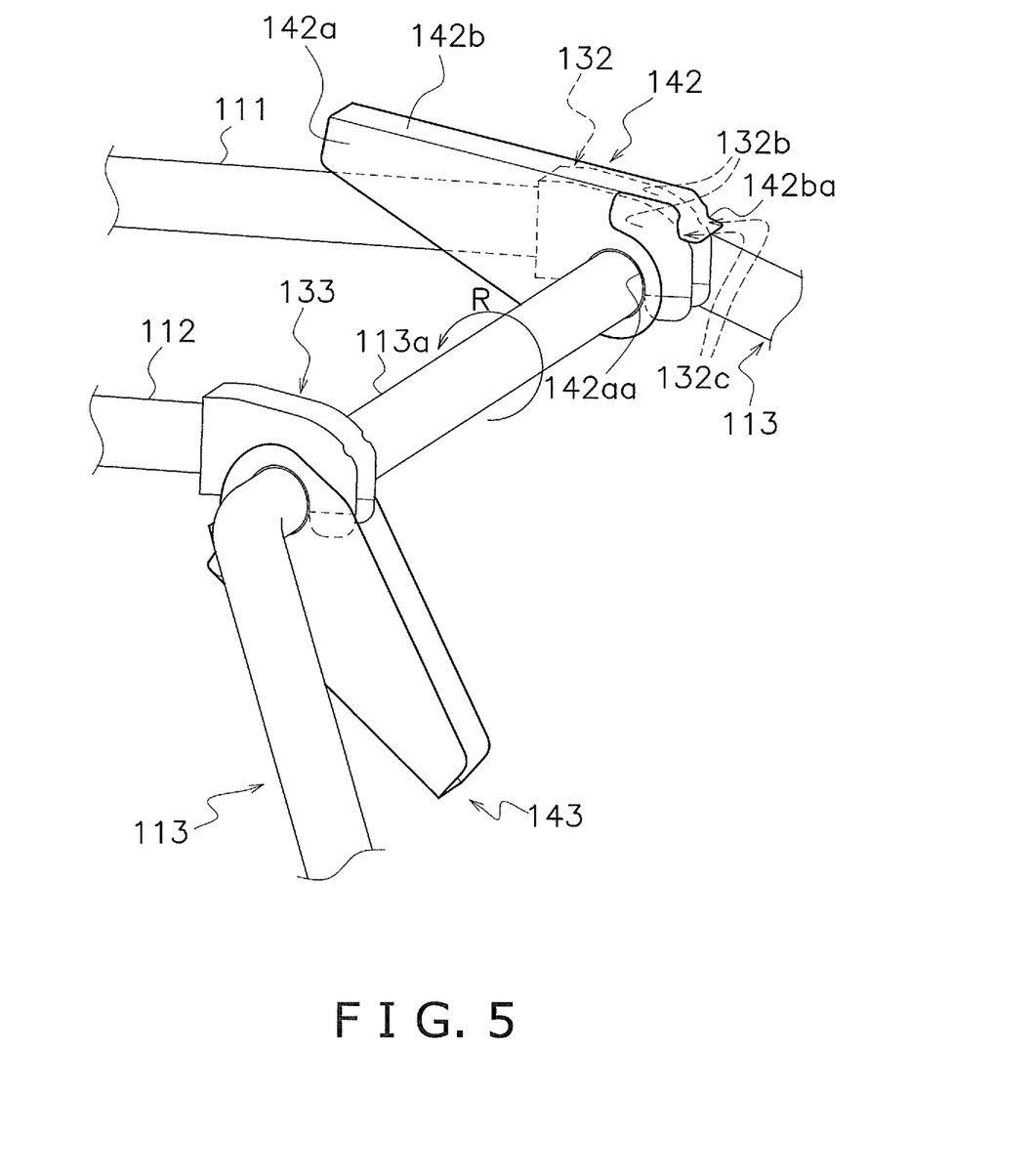
FIG. 5 shows, regarding the support frame of FIG. 3, a fixing state in which a hook is fixed by a fixing member and a releasing state in which the fixing of the hook is released.

The second fixing member 142 mainly has two plate-shaped side wall portions 142a (see FIG. 4) and a plate-shaped roof portion 142b that interconnects the two side wall portions 142a (see FIG. 5). The second fixing member 142 defines a groove whose cross section is U-shaped with the two side wall portions 142a and the roof portion 142b (see FIG. 4).

A hole 142aa through which the horizontal portion 113a of the third member 113 is inserted is formed in each of the side wall portions 142a (see FIG. 5). The diameters of the holes 142aa are formed a little larger than the diameter of the horizontal portion 113a. The horizontal portion 113a is inserted through the holes 142aa in the two side wall portions 142a, so that the second fixing member 142 is non-detachably attached to the third member 113 serving as an engaged member against which the second fixing member 142 presses the second hook 132 serving as an engaging member and to which the second fixing member 142 fixes the second hook 132. That is to say, the second fixing member 142 is connected to the third member 113 regardless of whether the second fixing member 142 is in the locked state, in which the second fixing member 142 restricts the movement of the second hook 132, or in the unlocked state, in which the second fixing member 142 releases the restriction of the movement of the second hook 132. The second fixing member 142 is movable along the horizontal portion 113a in a state in which the horizontal portion 113a is inserted through the holes 142aa. Furthermore, the second fixing member 142 is rotatable about the third member 113 in a state in which the horizontal portion 113a is inserted through the holes 142aa. The side wall portions 142a extend in such a way that their lengthwise direction coincides with the radial direction of the horizontal portion 113a in a state in which the side wall portions 142a are attached to the horizontal portion 113a. The holes 142aa are formed near the end portions on one side of the side wall portions 142a in the lengthwise direction of the side wall portions 142a.

An elastic deformation portion 142ba is disposed on the end portion of the roof portion 142b that is placed on the horizontal portion 113a side in a state in which the second fixing member 142 is attached to the horizontal portion 113a. The elastic deformation portion 142ba has a curved surface that projects toward the inside of the second fixing member 142 shaped like a groove.

All of the first fixing member 141, the second fixing member 142, the third fixing member 143, the fourth fixing member 144, and the fifth fixing member 145 have the same shape. For that reason, description regarding the shapes of the first fixing member 141, the third fixing member 143, the fourth fixing member 144, and the fifth fixing member 145 will be omitted. It should be noted that the first fixing member 141, the fourth fixing member 144, and the fifth fixing member 145 differ from the second fixing member 142 in that the first fixing member 141 is attached to the first member 111 and the fourth fixing member 144 and the fifth fixing member 145 are attached to the fourth member 114.

Next, the fixing of the second hook 132 as an engaging member to the third member 113 as an engaged member by the second fixing member 142 and the release of the fixing will be described. It should be noted that description regarding the fixing of the engaging members to the engaged members by the third to fifth fixing members 143, 144, and 145 and the release of the fixing will be omitted because they are the same as the fixing of the second hook 132 to the third member 113 by the second fixing member 142 and the release of the fixing.

The second fixing member 142 is switched between fixing the second hook 132 to the third member 113 and release of the fixing as a result of being rotated about the horizontal portion 113a to which the second fixing member 142 is attached. This will be specifically described below.

First, the orientation of the attachment of the second fixing member 142 to the horizontal portion 113a of the third member 113 will be described. The second fixing member 142 is made to engage with the horizontal portion 113a in such a way that the second hook 132 is placed inside the second fixing member 142 formed in the shape of a groove when the second fixing member 142 presses the second hook 132 against and fixes the second hook 132 to the horizontal portion 113a (see FIG. 5). That is to say, the second fixing member 142 is attached to the horizontal portion 113a in an orientation such that the second fixing member 142 approaches the second hook 132 from the open side of the second fixing member 142 formed in the shape of a groove when the second fixing member 142 is rotated in order to press the second hook 132 against and fix the second hook 132 to the horizontal portion 113a (see FIG. 5). In other words, the second fixing member 142 is attached to the horizontal portion 113a in an orientation such that the open side of the second fixing member 142 formed in the shape of a groove is placed on the forward side of rotation when the second fixing member 142 is rotated in order to press the second hook 132 against and fix the second hook 132 to the horizontal portion 113a (see FIG. 5).

The second hook 132 is made to engage with the horizontal portion 113a between the two side wall portions 142a of the second fixing member 142 attached to the horizontal portion 113a in this orientation (see FIG. 5).

In a state in which the fixing of the second hook 132 to the horizontal portion 113a is released (the unlocked state), the second fixing member 142 is in a state like that of the third fixing member 143 shown in FIG. 5, and the elastic deformation portion 142ba does not contact the second hook 132. In this state, the second fixing member 142 does not exert force on the second hook 132. In the unlocked state, the second fixing member 142 does not restrict the movement of the second hook 132.

When fixing the second hook 132 to the horizontal portion 113a with the second fixing member 142, the second fixing member 142 is rotated in such a way that the second hook 132 is placed inside the second fixing member 142 formed in the shape of a groove. When this is described with FIG. 5, the second fixing member 142 is rotated counter-clockwise (in the direction of arrow R in FIG. 5) from a state like that of the third fixing member 143 shown in FIG. 5. When the second fixing member 142 is rotated in the direction of arrow R in FIG. 5, the elastic deformation portion 142ba having the curved surface projecting toward the inside of the second fixing member 142 contacts the surface of the second hook 132 on the outer side of the combination weighing device 10 (the far side relative to the object supply chute 150). In other words, when the second fixing member 142 is rotated in the direction of arrow R in FIG. 5, the elastic deformation portion 142ba contacts the surface of the second hook 132 on the far side relative to the first member 111 on which the second hook 132 is disposed. When the elastic deformation portion 142ba contacts the second hook 132, the elastic deformation portion 142ba is elastically deformed in such a way as to stretch toward the outer side of the combination weighing device 10. At this time, the elastic deformation portion 142ba presses the second hook 132 toward the horizontal portion 113a with elastic force. As the second fixing member 142 is rotated further in the direction of arrow R in FIG. 5, the curved surface of the elastic deformation portion 142ba projecting toward the inside of the second fixing member 142 fits into recessed portions 132c formed in the plate-shaped members 132b of the second hook 132 (see FIG. 5). The recessed portions 132c are formed in corner portions serving as interfaces between the upper surfaces of the plate-shaped members 132b of the second hook 132 and the surfaces of the plate-shaped members 132b on the outer side of the combination weighing device 10. In this state, the elastic deformation portion 142ba elastically deformed in a direction away from the second hook 132 presses the second hook 132 against the horizontal portion 113a of the third member 113 with elastic force. More specifically, the elastic deformation portion 142ba presses the inner surfaces of the cutouts 132a in the second hook 132, which are arranged along and oppose a part of the peripheral surface of the horizontal portion 113a, against the horizontal portion 113a and fixes the inner surfaces of the cutouts 132a to the horizontal portion 113a. In this locked state, the second fixing member 142 restricts the movement of the second hook 132. The second fixing member 142 is prevented from rotating in the opposite direction of arrow R in FIG. 5 as a result of the curved surface of the elastic deformation portion 142ba fitting into the recessed portions 132c. It should be noted that, when the fixing of the second hook 132 to the horizontal portion 113a is released, force is applied to the second fixing member 142 so that the curved surface of the elastic deformation portion 142ba moves away from the recessed portions 132c and the second fixing member 142 rotates in the opposite direction of arrow R in FIG. 5.

It should be noted that, in a state in which the second fixing member 142 fixes the second hook 132 to the horizontal portion 113a, the second fixing member 142 covers, with the roof portion 142b from above, the second hook 132 which the second fixing member 142 presses against the horizontal portion 113a (see FIG. 5). Because the second fixing member 142 is configured in this way, scattered fragments of the objects and so forth can be prevented from becoming deposited in the engaged section of the second hook 132 and the horizontal portion 113a. Moreover, in a state in which the second fixing member 142 fixes the second hook 132 to the horizontal portion 113a, the roof portion 142b slopes relative to a horizontal plane (see FIG. 5). For this reason, scattered fragments of the objects and so forth can be prevented from becoming deposited on the roof portion 142b.

Next, the fixing of the first hook 131 to the first member 111 by the first fixing member 141 and the release of the fixing will be described.

Like the second fixing member 142, the first fixing member 141 is switched between fixing the first hook 131 to the first member 111 and release of the fixing as a result of being rotated about the first member 111 to which the first fixing member 141 is attached. This will be specifically described below.

First, the orientation of the attachment of the first fixing member 141 to the first member 111 will be described. The first fixing member 141 is attached to the first member 111 in the opposite orientation of the orientation of the attachment of the second fixing member 142 to the third member 113. That is to say, the first fixing member 141 is made to engage with the first member 111 in an orientation such that the first fixing member 141 approaches the first hook 131 from a roof portion 141b side of the first fixing member 141 when the first fixing member 141 is rotated in order to press the first hook 131 against and fix the first hook 131 to the first member 111 (see FIG. 7). In other words, the first fixing member 141 is attached to the first member 111 in an orientation such that the roof portion 141b side of the first fixing member 141 is placed on the forward side of rotation when the first fixing member 141 is rotated in order to press the first hook 131 against and fix the first hook 131 to the first member 111 (see FIG. 7). For that reason, when the first fixing member 141 presses the first hook 131 against and fixes the first hook 131 to the first member 111, most of the first hook 131 is placed outside the first fixing member 141 shaped like a groove.

The first hook 131 is made to engage with the first member 111 between two side wall portions 141a of the first fixing member 141 attached to the first member 111 in this orientation.

In a state in which the fixing of the first hook 131 to the first member 111 is cancelled (the unlocked state), an elastic deformation portion 141ba of the first fixing member 141 (see FIG. 7) does not contact the first hook 131. In this state, the first fixing member 141 does not exert force on the first hook 131. In the unlocked state, the first fixing member 141 does not restrict the movement of the first hook 131.

When fixing the first hook 131 to the first member 111 with the first fixing member 141, the first fixing member 141 is rotated in such a way that the elastic deformation portion 141ba contacts the first hook 131. When this is described with FIG. 7, the first fixing member 141 is rotated counter-clockwise (in the direction of arrow S in FIG. 7). When the first fixing member 141 is rotated in the direction of arrow S in FIG. 7, the elastic deformation portion 141ba having a curved surface projecting toward the inside of the first fixing member 141 contacts the surface of the first hook 131 on the far side relative to the object supply chute 150. When the elastic deformation portion 141ba contacts the first hook 131, the elastic deformation portion 141ba is elastically deformed in such a way as to stretch toward the far side relative to the object supply chute 150. At this time, the elastic deformation portion 141ba presses the first hook 131 toward the first member 111 with elastic force. As the first fixing member 141 is rotated further in the direction of arrow S in FIG. 7, the curved surface of the elastic deformation portion 141*ba* projecting toward the inside of the first fixing member 141 fits into recessed portions 131*c* formed in plate-shaped members 131*b* of the first hook 131 (see FIG. 7). The recessed portions 131*c* are formed in corner portions serving as interfaces between the upper surfaces of the plate-shaped members 131*b* of the first hook 131 and the surfaces of the plate-shaped members 131*b* on the far side relative to the object supply chute 150. In this state, the elastic deformation portion 141*ba* elastically deformed in a direction away from the first hook 131 presses the first hook 131 against the first member 111 with elastic force. More specifically, the elastic deformation portion 141*ba* presses the surfaces of the first hook 131, which are arranged along and oppose a part of the peripheral surface of the first member 111, against the first member 111 and fixes the surfaces of the first hook 131 to the first member 111. In this locked state, the first fixing member 141 restricts the movement of the first hook 131. The first fixing member 141 is prevented from rotating in the opposite direction of arrow S in FIG. 7 as a result of the curved surface of the elastic deformation portion 141*ba* fitting into the recessed portions 131*c*. It should be noted that, when the fixing of the first hook 131 to the first member 111 is released, force is applied to the first fixing member 141 so that the curved surface of the elastic deformation portion 141*ba* moves away from the recessed portions 131*c* and the first fixing member 141 rotates in the opposite direction of arrow S in FIG. 7.

It should be noted that, in a state in which the first fixing member 141 presses the first hook 131 against and fixes the first hook 131 to the first member 111, the first fixing member 141 is placed in a position where it is hidden by the object supply chute 150 and cannot be seen when viewed in a top view. More specifically, in a state in which the first fixing member 141 presses the first hook 131 against and fixes the first hook 131 to the first member 111, the first fixing member 141 is placed in a position where it is hidden by the circular truncated cone-shaped portion 150*a* of the object supply chute 150 and cannot be seen when viewed in a top view. Because of this, fragments of the objects and so forth can be prevented from becoming deposited on the first fixing member 141.

Figure 7:
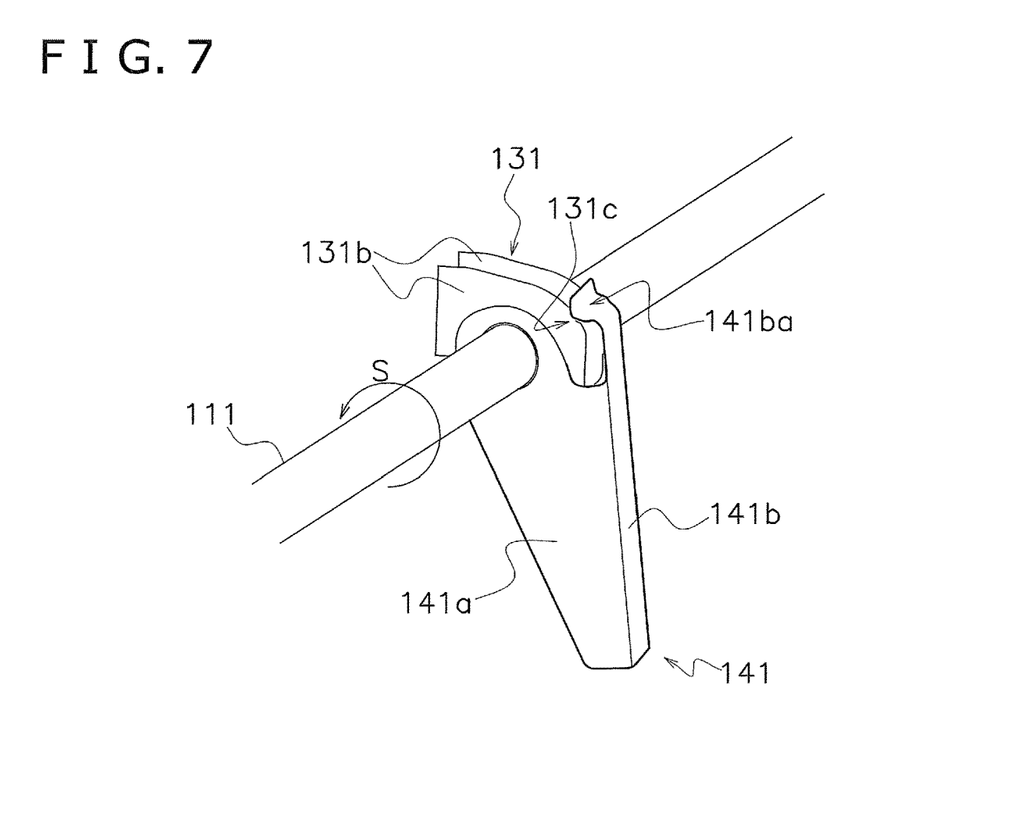
FIG. 7 shows a state in which a first hook is fixed by a first fixing member regarding the support frame of FIG. 3.

Furthermore, in a state in which the first fixing member 141 presses the first hook 131 against and fixes the first hook 131 to the first member 111, the roof portion 141*b* of the first fixing member 141 slopes relative to a horizontal plane (see FIG. 7). For this reason, scattered fragments of the objects and so forth can be prevented from becoming deposited on the roof portion 141*b*.

(2-7-3) Strut Members

The strut members 120 (see FIG. 3) are members that support the upper frame 110. The four strut members 120 are each formed in an L-shape (see FIG. 3). One end of each strut member 120 is secured to the side surface of the main body frame 80 (see FIG. 3). Each of the strut members 120 extends horizontally in the radial direction from the side surface of the main body frame 80 shaped like a column and then changes direction so as to extend upward. It should be noted that the strut members 120 have the insertion portions 121 in the sections thereof that extend upward and downward. The insertion portions 121 are inserted inside the insertion engagement portions 113*b* or the insertion engagement portions 114*b*. The insertion portions 121 extend from the lower portions to the upper ends of the sections of the strut members 120 that vertically extend. The insertion portions 121 are inserted inside the insertion engagement portions 113*b* and the insertion engagement portions 114*b* and are also inserted inside the spacers 122 described later. The spacers 122, the insertion engagement portions 113*b*, and the insertion engagement portions 114*b* are attached to the insertion portions 121 in the order of the spacers 122 and the insertion engagement portions 113*b* or the insertion engagement portions 114*b* from below (see FIG. 4).

(2-7-4) Spacers

The spacers 122 are hollow round pipe members which open at both ends. The spacers 122 extend in the upward and downward direction in a state in which the object supply chute 150 is supported by the support frame 100. The insertion portions 121 of the strut members 120 are inserted through the insides of the spacers 122. The spacers 122 are arranged under the insertion engagement portions 113*b* and the insertion engagement portions 114*b* into which the insertion portions 121 are similarly inserted. By appropriately changing the length of the spacers 122 in accordance with the attachment position of the object supply chute 150, the height position of the upper frame 110—in other words, the height position of the object supply chute 150—is changed.

(2-8) Control Unit

The control unit 70 has a CPU 76 and a memory 77 such as a ROM and a RAM (see FIG. 2). Furthermore, the control unit 70 has a multiplexer 71, an A/D converter 72, and a digital signal processor (DSP) 73 (see FIG. 2).

The multiplexer 71, in accordance with a command of the DSP 73, selects one weighing signal from the weighing signals of the load cells 52 and sends the weighing signal to the A/D converter 72. The A/D converter 72 converts the weighing signal (an analog signal) received from the multiplexer 71 into a digital signal in accordance with a timing signal sent from the DSP 73 and sends the digital signal to the DSP 73. The DSP 73 filters the digital signal sent from the A/D converter 72.

The control unit 70 is connected to each part of the combination weighing device 10, including the dispersion table 20, the radiation feeders 30, the stepping motors 41 and 51, and a touch panel 75. The touch panel 75 is a liquid crystal display (LCD) equipped with both input and output functions, and functions as an input unit and an output unit. The touch panel 75 receives the input of various types of settings and the like relating to combination weighing. For example, the touch panel 75 receives the input of operation parameters such as the vibration intensities of the dispersion table 20 and the radiation feeders 30 and the vibration time of the radiation feeders 30.

In the control unit 70, the CPU 76 controls each part of the combination weighing device 10 by executing a program stored in the memory 77.

The control unit 70 specifically controls the combination weighing device 10 in the following way, for example.

For example, the control unit 70 controls the non-illustrated electromagnets of the dispersion table 20 and the radiation feeders 30 and causes the dispersion table 20 and the radiation feeders 30 to vibrate. The control unit 70 controls the vibration of the dispersion table 20 and the radiation feeders 30 based on the operation parameters input from the touch panel 75, such as the vibration intensities of the dispersion table 20 and the radiation feeders 30 and the vibration time of radiation feeders 30.

Furthermore, for example, the control unit 70 performs combination calculation based on the weighing values in the weighing hoppers 50. Specifically, the control unit 70 uses the signals filtered by the DSP 73 to calculate the weight of the objects retained in each weighing hopper 50 and performs combination calculation so that the weight total is in a predetermined target weight range and closest to a target value. Additionally, the control unit 70 determines combinations of the weighing hoppers 50 based on the results of the combination calculation and controls the actions of the stepping motors 51 so that the WH gates 50a of the determined weighing hoppers 50 open. Furthermore, in a case where any of the weighing hoppers 50 is empty, the control unit 70 causes the stepping motor 41 to operate to open the PH gate 40a of the pool hopper 40 placed above that weighing hopper 50.

(3) Characteristics (3-1)

The combination weighing device 10 pertaining to the present embodiment is provided with the dispersion section 200, the weighing hoppers 50, the control unit 70, the object supply chute 150, and the support frame 100. The dispersion section 200 disperses and supplies objects around the dispersion section 200. The weighing hoppers 50 are arranged around the dispersion section 200. The control unit 70 performs combination calculation based on the weighing values in the weighing hoppers 50. The object supply chute 150 is arranged above the dispersion section 200 and supplies the objects to the dispersion section 200. The support frame 100 supports the object supply chute 150. The support frame 100 includes engaged members, engaging members that engage with the engaged members, and the fixing members 140 as an example of non-screw members. The engaged members include the first member 111, the third member 113, and the fourth member 114. The engaging members include the first hook 131 that engages with the first member 111, the second hook 132 and the third hook 133 that engage with the third member 113, and the fourth hook 134 and the fifth hook 135 that engage with the fourth member 114. The fixing members 140 fix the engaging members to the engaged members by pressing the engaging members against the engaged members. Specifically, the first fixing member 141 presses the first hook 131 against and fixes the first hook 131 to the first member 111. The second fixing member 142 presses the second hook 132 against and fixes the second hook 132 to the third member 113. The third fixing member 143 presses the third hook 133 against and fixes the third hook 133 to the third member 113. The fourth fixing member 144 presses the fourth hook 134 against and fixes the fourth hook 134 to the fourth member 114. The fifth fixing member 145 presses the fifth hook 135 against and fixes the fifth hook 135 to the fourth member 114.

Here, the fixing members 140 as the non-screw members are used for fixing the engaging members to the engaged members in the support frame 100 which supports the object supply chute 150. Therefore, in contrast to the case of using screw members which may become loose and fall off, it can be prevented that the screw members as foreign matters are mixed into the objects.

(3-2)

In the combination weighing device 10 pertaining to the present embodiment, the fixing members 140 have elastic deformation portions which are configured to elastically deform, and the fixing members 140 press the engaging members against the engaged members with elastic force. For example, in the second fixing member 142, the elastic deformation portion 142ba is configured to elastically deform and press the second hook 132 against the third member 113 with elastic force. The first fixing member 141, the third fixing member 143, the fourth fixing member 144, and the fifth fixing member 145 are configured as the same.

Here, the engaging members are pressed against the engaged members by elastic force. Therefore, it is easy to tightly fix the engaging members in desired positions.

(3-3)

In the combination weighing device 10 pertaining to the present embodiment, the fixing members 140 are used for fixing the engaging members to the engaged members at all locations above the dispersion section 200 and the weighing hoppers 50. That is to say, the fixing members 140 are used for fixing the first to fifth hooks 131, 132, 133, 134, and 135 to any of the first member 111, the third member 113, and the fourth member 114 at all locations above the dispersion section 200 and the weighing hoppers 50.

Here, only the fixing members 140 are used as the non-screw members for fixing the engaging members to the engaged members above the dispersion section 200 and the weighing hoppers 50. It is therefore easy to prevent that the foreign matter is mixed into the objects which are the targets of the combination weighing.

(3-4)

In the combination weighing device 10 pertaining to the present embodiment, the engaging members are hooks (the first to fifth hooks 131, 132, 133, 134, and 135) being configured to engage with any of the first member 111, the third member 113, and the fourth member 114 serving as the engaged members.

Here, the hooks serving as the engaging members can be hooked to the engaged members and thereby both of the hooks and the engaged members can be easily engaged with each other.

(3-5)

In the combination weighing device 10 pertaining to the present embodiment, the fixing members 140 include roof portions. For example, the second fixing member 142 includes the roof portion 142b. The second fixing member 142 is configured to cover the second hook 132 as an engaging member from above with the roof portion 142b. The second fixing member 142 is configured to press the second hook 132 against the third member 113 serving as an engaged member. The same explanation can be applied to the third fixing member 143, the fourth fixing member 144, and the fifth fixing member 145.

Here, the upper parts of the engaged sections of the engaging members and the engaged members on which scattered fragments of the objects and so forth easily accumulate are covered with the roof portions. Therefore, fragments of the objects and so forth hardly accumulate and good sanitary condition is achieved.

(3-6)

In the combination weighing device 10 pertaining to the present embodiment, the roof portions of the fixing members 140 slope relative to a horizontal plane. For example, the roof portion 142b of the second fixing member 142 slopes relative to a horizontal plane. The same explanation can be applied to the third fixing member 143, the fourth fixing member 144, and the fifth fixing member 145.

Here, the roof portions of the fixing members 140 slope relative to a horizontal plane. Therefore, it is easy to prevent the fragments of the objects and so forth from accumulating on the roof portions and better sanitary condition is achieved.

(3-7)

In the combination weighing device 10 pertaining to the present embodiment, the fixing members 140 are non-detachably and movably attached to the engaged members. Specifically, the first fixing member 141 is non-detachably and movably attached to the first member 111, the second fixing member 142 and the third fixing member 143 are non-detachably and movably attached to the third member 113, and the fourth fixing member 144 and the fifth fixing member 145 are non-detachably and movably attached to the fourth member 114.

Here, since the fixing members 140 are non-detachably attached to the engaged members, it is possible to prevent the fixing members 140 from falling off. Furthermore, since the fixing members 140 are movably attached to the engaged members, it is easy to adjust the position of the object supply chute 150.

(3-8)

In the combination weighing device 10 pertaining to the present embodiment, the first hook 131 serving as the engaging member is secured to the outer peripheral surface of the cylindrical portion 150b of the object supply chute 150. The first fixing member 141 configured to press the first hook 131 secured to the outer peripheral surface of the cylindrical portion 150b against the first member 111 and fix the first hook 131 to the first member 111 is arranged in a position where the first fixing member 141 is hidden by the object supply chute 150 and unsightly when viewed in a top view.

Here, the upper side of the first fixing member 141, which fixes the first hook 131 secured to the object supply chute 150 to the first member 111, is hidden by the object supply chute 150. Therefore, it is possible to prevent fragments of the objects and so forth from accumulating on the first fixing member 141 which fixes the object supply chute 150 to the first member 111 and thereby better sanitary condition is achieved.

(3-9)

In the combination weighing device 10 pertaining to the present embodiment, the support frame 100 includes the strut members 120, which have the insertion portions 121 extending upward, and the spacers 122. The strut members 120 support the upper frame 110 including the engaged members (the first member 111, the third member 113, and the fourth member 114) and the engaging members (the first to fifth hooks 131, 132, 133, 134 and 135). The insertion portions 121 of the strut members 120 are inserted through the spacers 122. The upper frame 110 has the insertion engagement portions 113b and the insertion engagement portions 114b through which the insertion portions 121 of the strut members 120 are to be inserted. Each of the spacers 122 is arranged under the insertion engagement portion 113b or the insertion engagement portion 114b.

Here, the spacers 122 are included in the support frame 100. Therefore, it is easy to adjust the position of the upper frame 110 in the upward and downward direction without using screw members.

(3-10)

In the combination weighing device 10 pertaining to the present embodiment, the support frame 100 includes engaged members, engaging members configured to engage with the engaged members, and the fixing members 140. The engaged members include the first member 111, the third member 113, and the fourth member 114. The engaging members include the first to fifth hooks 131, 132, 133, 134, and 135. The fixing members 140 are configured to be switchable between a locked state (a first state) and an unlocked state (a second state). The locked state is a state in which the fixing members 140 restrict the movement of the engaging members engaged with the engaged members. Specifically, the locked state is a state in which the first to fifth fixing members 141, 142, 143, 144, and 145 respectively restrict the movement of the first to fifth hooks 131, 132, 133, 134, and 135 engage with the engaged members. The unlocked state is a state in which the fixing members 140 release the restriction of the movement of the engaging members. Each of the fixing members 140 is connected to a part of the support frame 100 other than itself in both the locked state and the unlocked state. Specifically, in both the locked state and the unlocked state, each of the first to fifth fixing members 141, 142, 143, 144, and 145 is connected to the engaged member, to which the first to fifth hooks 131, 132, 133, 134, and 135 whose movement is restricted by that fixing member in the locked state, engages. More specifically, the first fixing member 141 is attached to the first member 111, the second fixing member 142 and the third fixing member 143 are attached to the third member 113, and the fourth fixing member 144 and the fifth fixing member 145 are attached to the fourth member 114.

Here, in the support frame 100, the fixing members 140 attached to parts of the support frame 100 (other than the fixing members themselves) are utilized for fixing the engaging members to the engaged members. Therefore, the fixing members 140 can be prevented from falling off as foreign matter and being mixed into the objects.

(4) Example Modifications

Example modifications of the above-described embodiment will be described below. The following example modifications may also be combined with other example modifications to the extent that they do not contradict each other.

(4-1) Example Modification A

The non-screw members of the combination weighing device pertaining to the present invention are not limited to the fixing members 140 having the structure pertaining to the above-described embodiment. Various types of fixing members that are not screw members and press the engaging members against and fix the engaging members to the engaged members can be utilized for the non-screw members.

For example, a structure where, like in a draw latch (snap lock), one end side of an elastic member (e.g., a member formed in a plate shape or an annular shape) is hooked on and fixed to a projection or the like and where elastic force is produced in the elastic member by collapsing a lever coupled to the other end side of the elastic member may also be utilized.

Furthermore, the non-screw members may also be members that utilize a spring or rubber or the like to produce a force that presses the engaging members against the engaged members.

(4-2) Example Modification B

The hooks serving as the engaging members of the combination weighing device pertaining to the present invention need not to be hooks having a shape in which a semicircular cutout is formed like the first to fifth hooks 131, 132, 133, 134, and 135 pertaining to the above-described embodiment.

For example, the hooks serving as the engaging members may be hooks having opposing surfaces along the entire peripheral surfaces of the engaged members (the first member 111, etc.). Specifically, for example, the hooks of the engaging members may also be formed in ring shapes along the entire peripheral surfaces of the engaged members. Additionally, the hooks as the engaging members may also be configured to be hooked to the engaged members by placing the engaged members inside the ring-shaped hooks. It should be noted that in a case where the hooks are formed in ring shapes along the entire peripheral surfaces of the engaged members, it is preferred that a structure where the hooks can be easily attached to the engaged members be used. Specifically, for example, it is preferred that a structure where the ring is divided into two and these are coupled to each other by a hinge or the like be used for the hooks. By configuring the hooks in this way, it is easy to attach the hooks to, and detach the hooks from, the engaged members and adjust the positions of the hooks.

(4-3) Example Modification C

In the above-described embodiment, hollow round pipes are utilized for the first member 111, the third member 113, and the fourth member 114 serving as the engaged members, but the engaged members are not limited to this.

For example, solid rod-shaped members may be disposed as the engaged members. However, utilizing hollow pipes is preferred because solid rod-shaped members are greater in weight.

Furthermore, it is not necessary for the cross sections of the engaged members to be circular, and pipes whose cross sections have a polygonal shape—such as a square shape—or an elliptical shape may also be utilized. The cutouts in the hooks may be formed in appropriate shapes in accordance with the cross-sectional shapes of the engaged members. However, by utilizing, as the engaged members, members having shapes without much of a horizontal surface, like the round pipes in the above-described embodiment, it is easier to prevent scattered fragments of the objects and so forth from accumulating on the upper frame 100 and thereby better sanitary condition is achieved.

Furthermore, it is not necessary for the engaged members to be formed in rod shapes using pipes or the like, and the engaged members may be plate-shaped members.

(4-4) Example Modification D

In the above-described embodiment, the height of the attachment position of the upper frame 110 is adjusted using the spacers 122, but the present invention is not limited to this. For example, the spacers 122 do not have to be disposed in a case where, for example, it is not necessary to adjust the height position.

(4-5) Example Modification E

The configuration of the support frame 100 in the above-described embodiment is exemplary and is not limited to this.

For example, the shapes of the third member 113 and the fourth member 114, and the number of places where the hooks are caused to engage with the engaged members and fixed by the fixing members 140, are not limited to those in the above-described embodiment. Furthermore, for example, the present invention may also be configured in such a way that a hook having the same shape as the first hook 131 is alternatively utilized at the position where the horizontal engagement hook 136 is used in the above-described embodiment and that hook is fixed by an fixing member 140.

INDUSTRIAL APPLICABILITY

The combination weighing device pertaining to the present invention is useful as a highly reliable combination weighing device with an object supply chute disposed above a dispersion section, which can prevent the foreign matter from being mixed into the objects due to the falling of screw members from a support frame supporting the object supply chute.

REFERENCE SIGNS LIST

10 Combination Weighing device
50 Weighing Hoppers
70 Control Unit
100 Support Frame
110 Upper Frame
111 First Member (Engaged Member)
113 Third Member (Engaged Member)
114 Fourth Member (Engaged Member)
113b, 114b Insertion Engagement Portions
120 Strut Member
122 Spacer
131 First Hook (Engaging Member, engaging member secured to the outer peripheral surface of the object supply chute)
132 Second Hook (Engaging Member)
133 Third Hook (Engaging Member)
134 Fourth Hook (Engaging Member)
135 Fifth Hook (Engaging Member)
140 Fixing Members (Non-screw Members)
141 First Fixing Member (Non-screw Member, non-screw member that presses the engaging member secured to the outer peripheral surface of the object supply chute against the engaged member and fixes the engaging member to engaged member)
142 Second Fixing Member (Non-screw Member)
143 Third Fixing Member (Non-screw Member)
144 Fourth Fixing Member (Non-screw Member)
145 Fifth Fixing Member (Non-screw Member)
142b Roof Portion of Second Non-screw Member (Roof Portion of Non-screw Member)
150 Object Supply Chute
200 Dispersion Section

CITATION LIST

Patent Literature

Patent Document 1: JP-U No. H5-14019

The invention claimed is:
1. A combination weighing device comprising:
a dispersion section configured to disperse and supply objects around the dispersion section;
weighing hoppers arranged around the dispersion section;
a control unit configured to perform combination calculation based on weighing values in the weighing hoppers;
an object supply chute arranged above the dispersion section and configured to supply the objects to the dispersion section; and
a support frame configured to support the object supply chute,
the support frame including an engaged member, an engaging member configured to engage with the engaged member, and a pressing and fixing member, and the pressing and fixing member being configured to press the engaging member against the engaged member and fix the engaging member to the engaged member, wherein the pressing and fixing member is non-detachably and movably attached to the engaged member.

2. The combination weighing device according to claim 1, wherein at least a portion of the pressing and fixing member is configured to elastically deform and press the engaging member against the engaged member with elastic force.

3. The combination weighing device according to claim 1, wherein the pressing and fixing member is configured to be used for fixing the engaging member to the engaged member at all locations above the dispersion section and the weighing hoppers.

4. The combination weighing device according to claim 1, wherein the engaging member is a hook being configured to engage with the engaged member.

5. The combination weighing device according to claim 1, wherein the pressing and fixing member includes a roof portion, and the pressing and fixing member is configured to cover the engaging member which is pressed against the engaged member by the pressing and fixing member from above with the roof portion.

6. The combination weighing device according to claim 5, wherein the roof portion slopes relative to a horizontal plane.

7. The combination weighing device according to claim 1, wherein at least one engaging member is secured to an outer peripheral surface of the object supply chute, and the pressing and fixing member is arranged in a position where the pressing and fixing member is hidden by the object supply chute and unsighted when viewed in a top view.

8. The combination weighing device according to claim 1, wherein the support frame further includes a strut member extending upward and configured to support an upper frame including the engaged member and the engaging member and a spacer through which the strut member is configured to be inserted, the upper frame has an insertion engagement portion through which the strut member is to be inserted, and the spacer is arranged under the insertion engagement portion.

9. A combination weighing device comprising:

a dispersion section configured to disperse and supply objects around the dispersion section;

weighing hoppers arranged around the dispersion section;

a control unit configured to perform combination calculation based on weighing values in the weighing hoppers;

an object supply chute arranged above the dispersion section and configured to supply the objects to the dispersion section; and a support frame configured to support the object supply chute, the support frame configured to support the object supply chute The support frame including an engaged member, an engaging member configured to engage with the engaged member, and a fixing member configured to be switchable between a first state in which the fixing member restricts the movement of the engaging member engaged with the engaged member and a second state in which the fixing member releases the restriction of the movement of the engaging member, and the fixing member being connected to a part of the support frame in both the first state and the second state, wherein the fixing member is non-detachably and movably attached to the engaged member.

* * * * *